(12) United States Patent
Huang et al.

(10) Patent No.: US 8,950,253 B2
(45) Date of Patent: Feb. 10, 2015

(54) MEMS MASS FLOW SENSOR ASSEMBLY AND METHOD OF MAKING THE SAME

(71) Applicants: Liji Huang, San Jose, CA (US); Chih-Chang Chen, Cupertino, CA (US)

(72) Inventors: Liji Huang, San Jose, CA (US); Chih-Chang Chen, Cupertino, CA (US)

(73) Assignee: M-Tech Instrument Corporation (Holding) Limited, Hong Kong (HK)

( * ) Notice: Subject to any disclaimer, the term of this patent is extended or adjusted under 35 U.S.C. 154(b) by 257 days.

(21) Appl. No.: 13/736,941

(22) Filed: Jan. 8, 2013

(65) Prior Publication Data

US 2014/0190252 A1 Jul. 10, 2014

(51) Int. Cl.
*G01F 1/68* (2006.01)
*G01F 1/69* (2006.01)

(52) U.S. Cl.
CPC .................................... *G01F 1/69* (2013.01)
USPC ..................................................... 73/204.25

(58) Field of Classification Search
USPC ................. 73/204.26, 204.15, 204.27, 23.42
See application file for complete search history.

(56) References Cited

U.S. PATENT DOCUMENTS

| 7,536,908 B2 * | 5/2009 | Wang et al. | 73/204.26 |
| 8,626,413 B2 * | 1/2014 | Kammann | 701/69 |
| 2011/0146398 A1 * | 6/2011 | Beck et al. | 73/204.27 |
| 2012/0090378 A1 * | 4/2012 | Wang et al. | 73/23.42 |

* cited by examiner

*Primary Examiner* — Jewel V Thompson

(57) ABSTRACT

A silicon mass flow sensor manufacture process that enables the backside contacts and eliminates the conventional front side wire binding process, and the assembly of such a mass flow sensor is disclosed in the present invention. The achieved assembly enhances the reliability by eliminating the binding wire exposure to the flow medium that may lead to detrimental failure due to the wire shortage or breakage while the miniature footprint could be maintained. The assembly further reduces flow instability from the flow sensor package including the bump of wire sealing. The invented mass flow sensor assembly can be a flow sensor module if the supporting sensor carrier is pre-designed with the control electronics. Without the control electronics, the said mass flow sensor assembly is easy to install into desired flow channels and connect to the external control electronics.

14 Claims, 7 Drawing Sheets

Sealing of the sensor to carrier edges and final formation of the sensor assembly

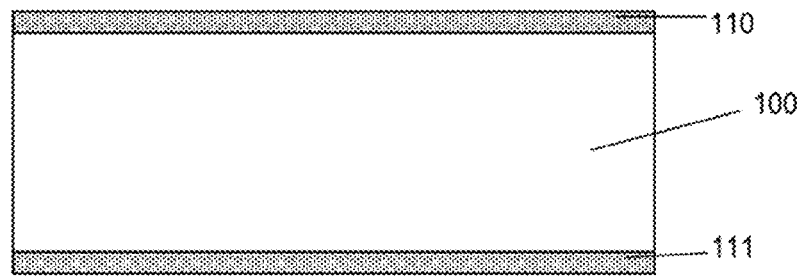
Figure 1. Bulk silicon with insulation layer.
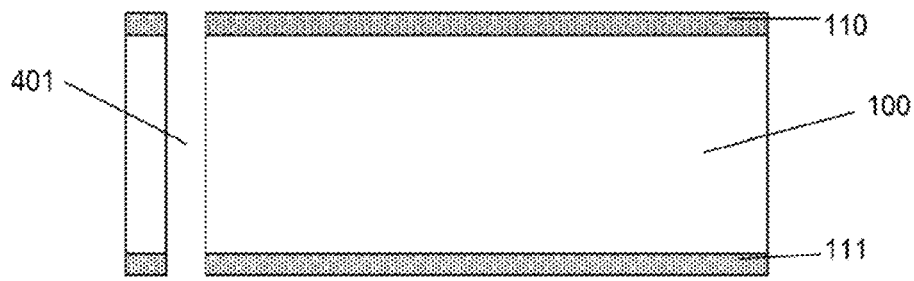
Figure 2. Open through hole for backside contact.
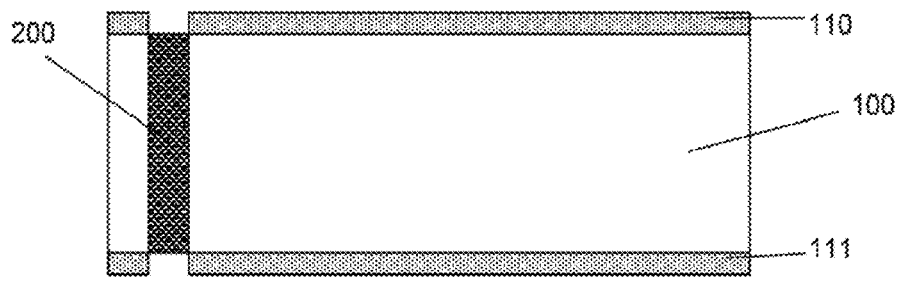
Figure 3(a). Form through hole metal connections.
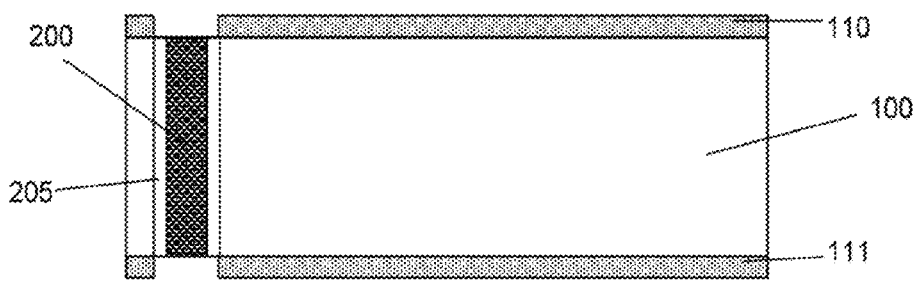
Figure 3(b). Form through hole metal connections with isolation.

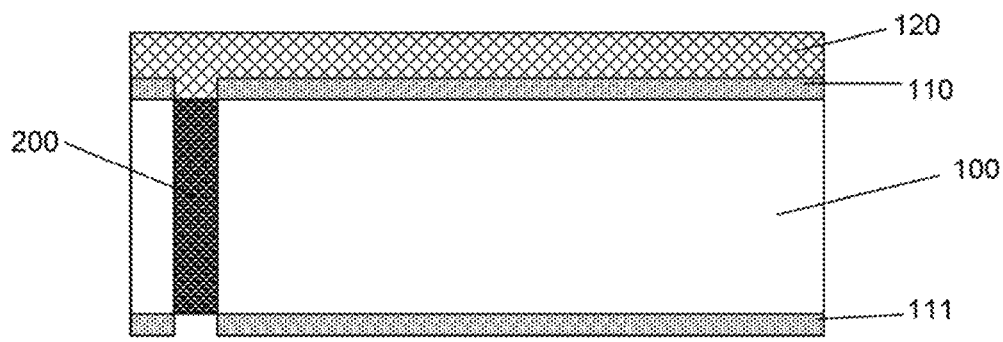
Figure 4. Form supporting membrane.
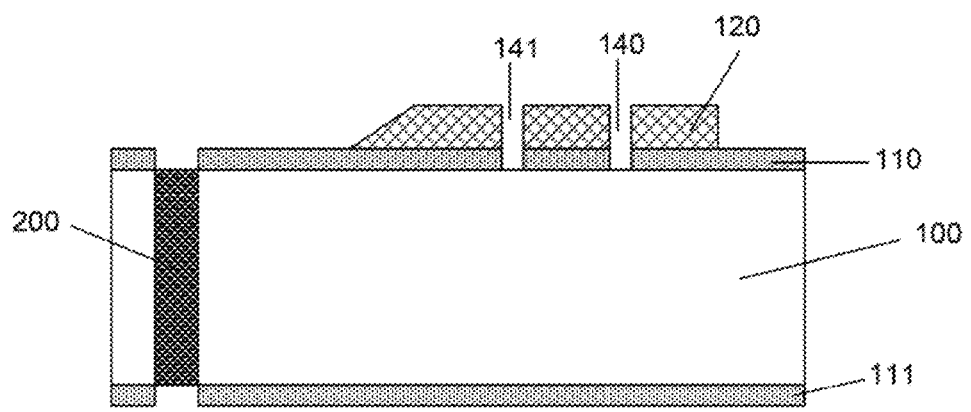
Figure 5. Pattern membrane.

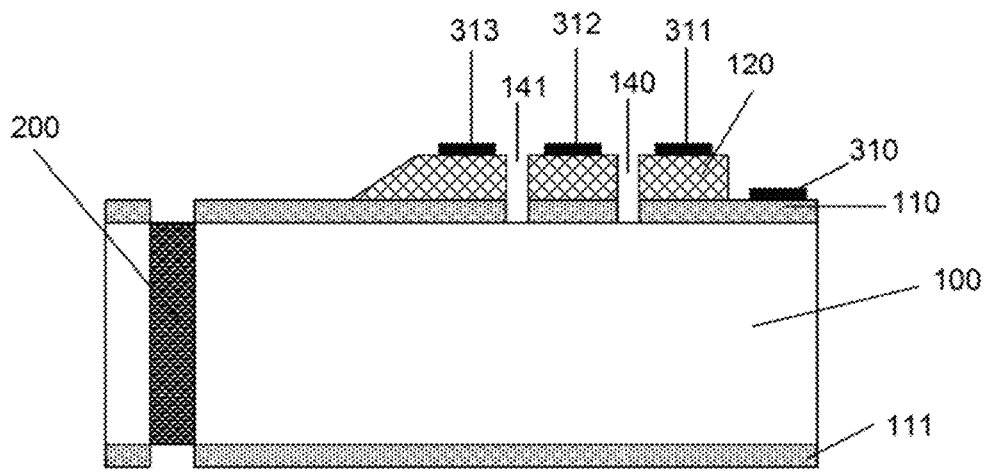
Figure 6. Form sensing elements.
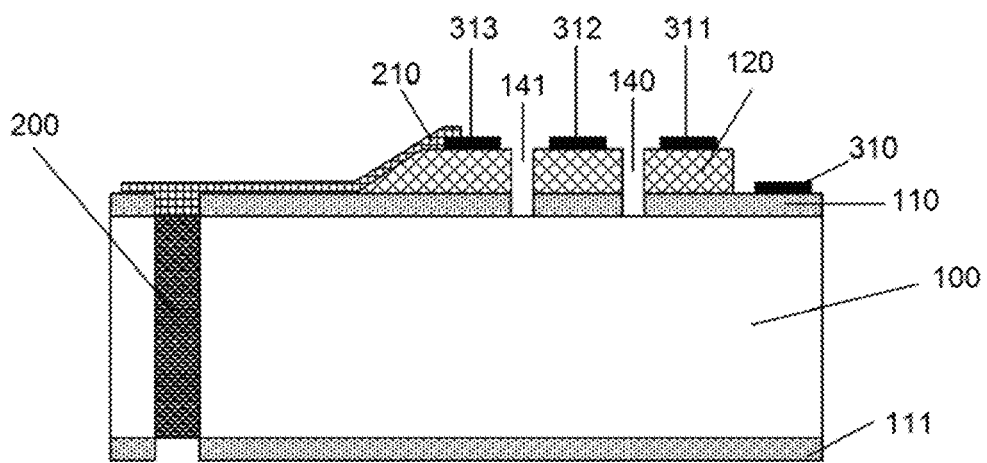
Figure 7. Form inter-connection.

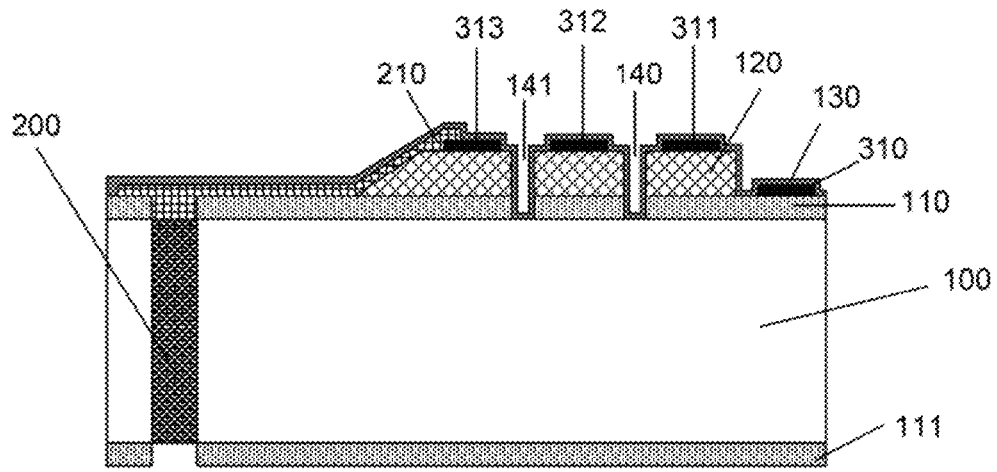
Figure 8. Form surface passivation and protection.
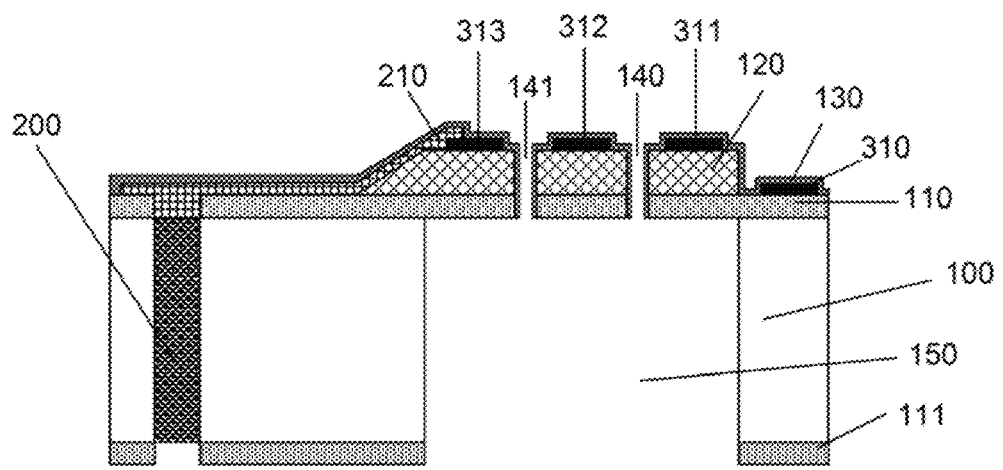
Figure 9. Form cavity for thermal isolation.

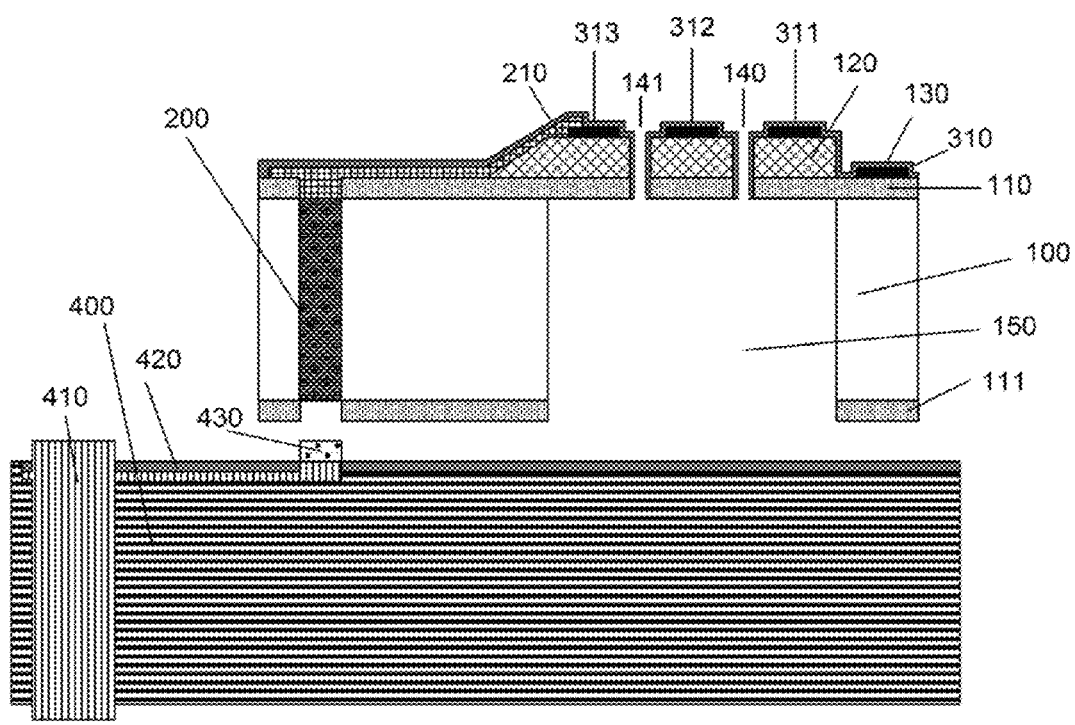
Figure 10. Sensor assembly interface preparation.

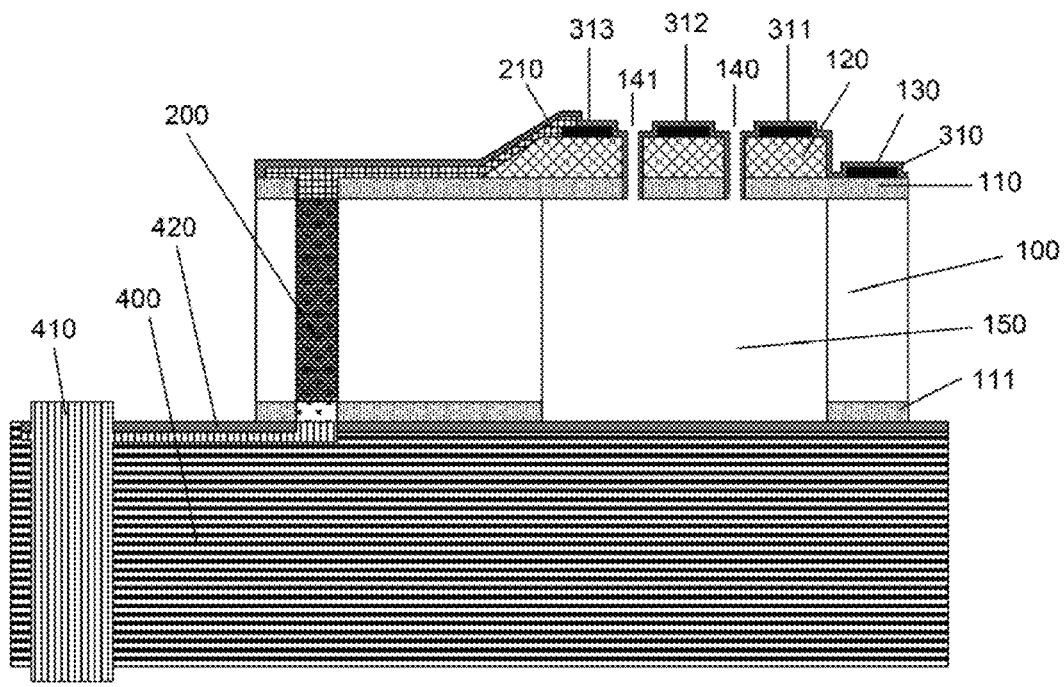
Figure 11. Final formation of the sensor assembly.

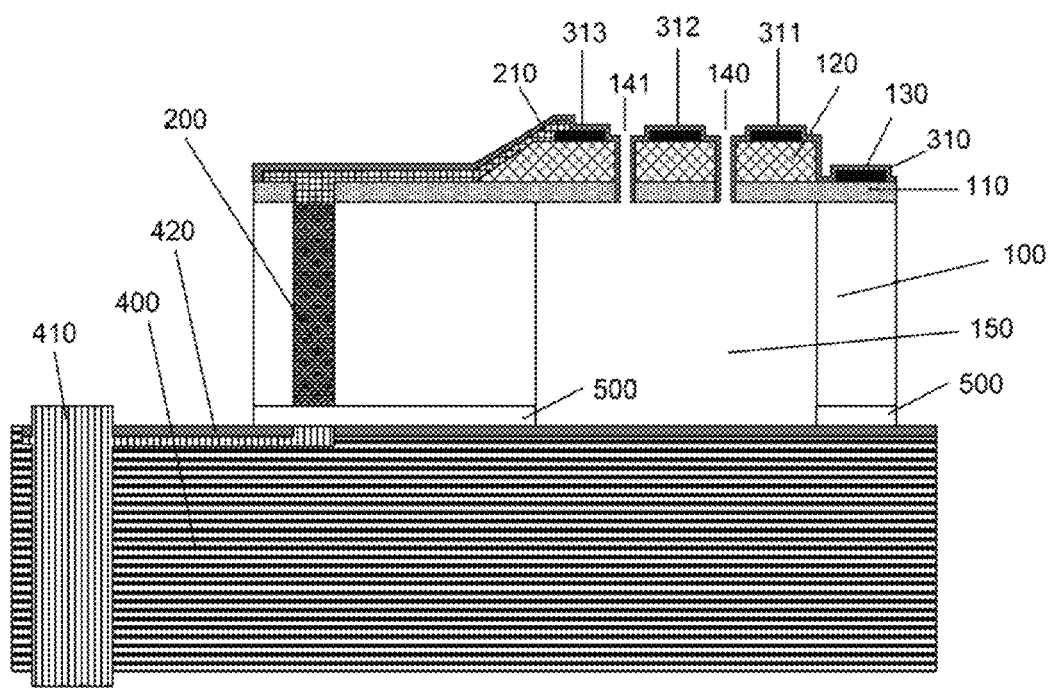
Figure 12. Sealing of the sensor to carrier edges and final formation of the sensor assembly

MEMS MASS FLOW SENSOR ASSEMBLY AND METHOD OF MAKING THE SAME

We claim the priority to U.S. provisional application Ser. No. 61/585,908, filed on Jan. 12, 2012.

BACKGROUND OF THE INVENTION

1. Field of the Invention

This invention relates to micromachined silicon sensors or Micro Electro Mechanical Systems (MEMS) mass flow sensing technology that minimizes the disturbance around the sensor chip due to the connection of wires. This invention also provides the enhanced reliability that eliminates the sensor malfunction or damage due to the short or destruction of the exposed connection wires between the sensor chip and its carrier. The present invention further facilitates the automation process of the sensor module manufacture. This invention additionally reduces the cost of the sensor module manufacture with the reduction of wire binding of the sensor chip to its carrier and sealing process.

2. Description of the Related Art

MEMS mass flow sensors for gases have been limited to clean and dry gases, partly due to the design limitation of the most available products on market. Previously disclosure by Higashi et al. (Higashi, R. E. et al., Flow sensor, U.S. Pat. No. 4,501,144) teaches us a miniature flow speed device that could be used for measuring gas flow using the calorimetric, thermal mass flow measurement principle. The device is constructed with the MEMS process technology with a footprint of approximately 2×2 mm. The connection pads to the external control electronics are distributed along the edge of the chip front surface. Consequently, the wire connection between the device and the interface has to be exposed to the gas medium resulting in a volatile and fragile nature against fluids that may contain moisture, other conductive dilute mist, and particle, since these materials can lead to a shortage of the wire or even a destruction of the whole device. Further high speed flow pulsed flow may also create unpredictable damages to the connection wires or the devices as a whole. Alternatively, Mayer et al. (Mayer. F. and Lechner, M., Method and sensor for measuring a mass flow, U.S. Pat. No. 6,550,324) teach an integrated MEMS mass flow sensor chip using thermal pile sensing elements and CMOS integrated signal processing circuitry that effectively solve the problem for interface wire exposure and is cost effective. The device has a footprint about 3×6 mm. But the configuration also requires that the electronic control circuitry be effective sealed from the contact of the flow medium otherwise it would at least add large noises and other unexpected instabilities. Hence package of such a design requires the flow medium only passes through the sensing element but not the electronic portion of the MEMS chip that in return places a limit of a fluid channel size within about 2 mm in diameter. Therefore for most of the measurement concerned the flow channel packaged with the sensor chip could be only used for a bypass configuration of the complete measurement unit. This again limited the applications for fluid in a larger pipeline while adding possible pressure loss in the main flow channel in order to drive the gas medium into the bypass sensing configurations. Later improvement using a complicated segregated bypass structure by Ueda et al. (Ueda, N. and Nozoe, S., Flow rate measuring device, US Patent Application 2008/0314140) and Fujiwara et al., (Fujiwara, T.; Nozoe, S. and Ueda, N., Flow velocity measuring device, U.S. Pat. No. 7,062,963) to avoid the clogging of particles in the small bypass channels however did not change the basic package landscape of the bypass configuration, and the complicated channel design might only improves the failure rate of particle impact but the damages due to the presence of the liquid is still an unsolved issue.

In a later disclosure by Hecht et al, (Hecht. H. et al., Method for correcting the output signal of an air mass meter, U.S. Pat. No. 5,668,313) and Wang et al., (Wang, G. et al., Micromachined mass flow sensor and insertion type flow meters and manufacture methods. U.S. Pat. No. 7,536,908), the MEMS mass flow sensor is arranged on an elongated foot print of approximate 3×6 mm and 2×4 mm respectively, such that the binding pads on the MEMS chip front surface that connect with the electronic interface through wires are placed away from the sensing element and the wired interface can be sealed with package sealing materials such as silicone and epoxy. The configuration could then prevent the wire interface from damages due to presence of moisture and impact from conductive substances. Nonetheless, such a configuration shall create an unavoidable scaling hump on the MEMS chip front surface for which the bump shape is usually difficult to control, which would also be undesirable for maintaining the stability for the flow medium passing through the front MEMS chip surface. Further, the package processes of the said prior arts all require the wire binding and/or wire interface sealing process. These processes are both time consuming and might also incur additional reliability uncertainties due to the sealing materials stress release, false soldering during wire binding, as well as leakage of the sealing.

It is therefore desired to have a new MEMS mass flow sensor design such that the final MEMS chip package or assembly of the sensor shall result in a smooth surface for keeping the flow stability as well as for purpose of reducing the process steps such that to enhance the reliability and performance of MEMS flow sensor package or assembly.

SUMMARY OF THE INVENTION

It is the objective of this invention to design a process as well as the package assembly for the MEMS mass flow sensors utilizing the thermal calorimetric principle and the sensing elements are placed on the front side of the silicon wafer surface with the supportive membrane made of silicon nitride or polymers. The preferred MEMS mass flow sensor shall be free of the front side wire binding configuration such that the major reliability due to wire failure could be eliminated while the flow instability shall be minimized by eliminating the bumps created by the sealing of the wires interface between the MEMS chip and the control electronics. The invented design shall also maintain a minimal footprint required for the said MEMS mass flow sensors for cost considerations. The process of the said sensor assembly shall further provide the fully automation approaches in order to meet the objectives of manufacturability and flexibility.

In one preferred embodiment, the invented MEMS mass flow sensor and the sensor assembly shall be free of the conventional wire binding process and the complete assembly including the MEMS chip die attachment, connection to the electronic interface and further attachment interface to the flow sensor module could be easily opted for automation in flow module manufacture. The said mass flow sensor shall further be in a miniature footprint for the advantage of cost for massive deployment.

In another preferred embodiment, the invented MEMS flow sensor assembly shall have the mass flow sensing elements on the surface of the silicon wafer substrate, but shall be free from front side wire binding. The sensing elements shall be made of stable metals with large temperature coefficients such as platinum or nickel or permalloy or heavily doped polysilicon materials. The connection from the sensor chip to its control electronics shall instead be preferred to be through the chip backside connection by forming through chip conduction pathways with nominal electrical resistances. The conduction pathways connect the chip front sensing elements to the chip backside connection pads. This configuration or design shall then make it possible to have the connection from the MEMS mass flow sensor chip to the control electronics via the direct soldering of the backside contacts to the pads on the printed circuitry board of the control electronics. Therefore the sensor chip front side wire binding connection is eliminated.

In another preferred embodiment that the MEMS mass flow sensor chip is made on a non-conductive silicon substrate, the formation of the through chip conduction pathways could be done by deep reactive ion etch of the through holes on the pre-arranged or pre-defined area on the sensor chip following by filling the holes with highly conductive materials. Such conductive materials can be formed by filling the holes with metal plating that gradually fills up the pre-defined holes with conductive metals such as nickel or nickel iron alloy. The conductive materials could alternatively be conductive polymers such as polypyrenes or polycarbazoles. In the preferred embodiment that the MEMS mass flow sensor chip is made on a heavily doped or conductive silicon substrate, the formation of the through chip conduction pathways could be done by deep reactive ion etch of the deep trench rings on the pre-arranged or pre-defined area on the chip following by filling the rings with isolation materials such as silicon oxides or non-conductive polymers such as polyimide. The depth of the trench rings shall be dependent on the process capability as the non-trench portion shall be removed thereafter to form the completed isolation. The remaining conductive silicon materials shall serve as the conduction pathway for the connection of the MEMS sensor sensing, elements with the printed circuitry of the control electronics.

In another preferred embodiment, the fabricated MEMS mass flow sensor chip shall have its backside contact pads preferably made of gold, or for cost reduction of aluminum. The pads connect the front side sensing elements via the conduction pathways through the wafer that are formed as described above while connection to the control electronics could be through direct soldering by die-attachment to the carrier holder's connection pads for the control electronics.

In yet another preferred embodiment, the invented MEMS mass flow sensor assemblies shall have their carrier for the MEMS silicon chip with the said backside connection pads in the form of printed circuitry hoard. The printed circuitry board is preferably made of ceramics such as silicon nitride or cubic boron nitride for high temperature applications. For alternative applications at ambient or at other environments where applications are specified, the printed circuitry board could also be made of conventional laminates or Resin impregnated B-stage cloth or other copper based materials. Dependent of the applications, the printed circuitry hoard could be a simple connection wire interface for control electronic components. The MEMS chip could then attached to the printed circuitry hoard through automated die attachment equipment for final formation of the assembly.

In yet another preferred embodiment, for applications in some harsh environments where water vapors or other conductive substances are presented, the said assembly requires a special sealing process that seals the MEMS mass flow sensor chip lower surface edges where they are in contact with the printed circuitry hoard. The sealing is preferably done with epoxy or other materials where the applications specify, such as high temperature sealing epoxy. The seal shall be effectively preventive for the shortage in the circuitry below the MEMS sensor chips.

For the invented MEMS mass flow sensor assembly, it is desirable that the assembly shall be free of exposed standing wires on the sensor chip front surfaces, while an automated process could be easily applied for manufacture of such an assembly. The invented assembly process shall have the flexibility as the different applications specify and where applicable the assembly shall be free from any reliability damage due to the shortage causing from the flow medium. The assembly is further desirable that the miniature footprints can be maintained such that mass manufacture could be feasible.

BRIEF DESCRIPTIONS OF THE DRAWINGS

FIG. 1. Bulk silicon with insulation layer.
FIG. 2. Open through hole for backside contacts.
FIG. 3(a). Form through holes with conductive connections.
FIG. 3(b). Form through holes with conductive connections and isolations
FIG. 4. Form supporting membrane.
FIG. 5. Pattern membrane.
FIG. 6. Form sensing elements.
FIG. 7. Form inter-connection.
FIG. 8. Form surface passivation and protection.
FIG. 9. Form cavity for thermal isolation.
FIG. 10. Sensor assembly interface preparation.
FIG. 11. Formation of the sensor assembly.
FIG. 12. Sealing of the sensor to carrier edges and final formation of the sensor assembly.

DETAILED DESCRIPTION OF THE PREFERRED EMBODIMENTS

The preferred MEMS mass flow sensor assembly starts with sensor manufacture on a silicon substrate (100) or silicon water as shown in FIG. 1. The preferred silicon substrate is of high electrical conductivity either heavily doped with phosphorus or boron but preferred to be heavily doped with boron. The silicon substrate is further preferred to be non-electrical conductive silicon substrate without any doping. The silicon substrate is passivated using silicon nitride (110 and 111) at its both surfaces using low pressure chemical vapor deposition. The thickness of the silicon nitride should be from 100 to 300 nm but preferably 200 nm.

The preferred MEMS mass flow sensor is then proceed to open the through wafer conductive pathways and the pre-designed locations (401). For several viable processes, the pathways could be through the silicon substrate as shown in FIG. 2. Or alternatively it can be made half way through while the remaining on through-hole portions could be later removed using chemical-mechanical planarization. The through-hole dimensions are preferably from 50 nm to 2000 nm but most favorably 1000 nm.

FIG. 3(a) shows the addition of the highly conductive materials (200) to the through holes on condition that the silicon substrate (100) is non-conductive. The conductive materials can be metal such as nickel or permalloy or highly doped conductive polysilicon or conductive polymers such as polypyrenes or polycarbazoles. In the event that the silicon substrate (100) is highly conductive, the conductive materials could be alternatively using the substrate itself while the through holes shall be rings (205) formed with isolation materials instead as shown in FIG. 3(b). The isolation materials to fill the rings can be silicon oxide or non-conductive polymers such as polyimide. The isolation ring widths are preferably 100 to 500 nm but most preferably 300 nm.

The mass flow sensor is then continued to the next manufacture step of the formation of thermal isolation supporting membranes (120) on the isolated silicon substrate. The materials of the membrane must be mechanically strong enough while with low stress such that the additional processes will not destroy the membrane. The preferably membrane materials shall be silicon nitride or polyimide, and in most favorably configuration the materials shall be polyimide with a thickness of 1000 nm to 10000 nm and most preferably the thickness shall be 3000 nm. The most favorable tooling for making the silicon nitride is low pressure chemical vapor deposition, while the polyimide can be done via the spin-coating.

After the supporting membrane is patterned using dry etching or other available techniques such as wet etch, in order to ensure there shall be no deformation of the membrane after the sensor assembly is completed and being placed in the flow channel for measurement, the pressure balance configuration (140 and 141) shown in FIG. 5 is made by dry etching of the membrane to the silicon substrate as the materials underneath shall be removed for thermal isolation in later process steps. The pressure balance mechanism is by making through membrane holes that can be in any shape but preferably in the shape of rectangles or circles, and preferably with the size of 5000 nm to 50000 nm but most preferably with the size of 10000 nm. These through holes let the flow medium fills the underneath thermal isolation cavity quickly in the presence of the flow medium, forming an equal pressure above and below the membranes. This is particularly important as the calibration of the mass flow sensor is under in most cases ambient conditions, the deformation of the membrane shall bring large errors of the measurement. The configuration is also preferably made around the micro-heater to be deposited in the next process step such that the temperature field created by the micro-heater shall be isolated for better measurement resolution and/or sensitivity.

In FIG. 6, sensing elements 311 and 313 are deposited on the supporting membrane. The micro-heater 312 is also deposited on the membrane sitting at the middle of the sensing elements 311 and 313, as primarily the calorimetric thermal principle shall be utilized. A separate thermistor 310 that measures the environmental temperature to provide the feedback for the micro-heater control such that a stable temperature field shall be generated is deposited on the substrate above the isolation later 110 such that the environmental temperature can be accurately measured. These thermistors are preferably made of stable high temperature coefficient materials such as platinum, gold, nickel, permalloy, and doped conductive polysilicon through electronic beam evaporation or physical vapor deposition. The thickness of each of the thermistors is preferably in the range of 100 nm to 300 nm but most preferably 200 nm for stability and performance.

The interconnections 210 shown in FIG. 7 connect the sensing elements, micro-heater and the environmental thermistor to the through conductive pathways. Before the process of the interconnections, the two ends of the through substrate conductive materials shall be processed for metallization such that good connection can be ensured. The interconnection is preferably made of gold or doped conductive polysilicon by electronic beam evaporation or physical vapor deposition. The thickness of the interconnection is preferably in the range of 100 nm to 300 nm but most preferably 200 nm for stability and performance.

In order to prevent damages of the mass flow sensor from the surface shortages between the sensing elements, micro-heater, environmental thermistor and among the interconnections, surface passivation is the direct solution. As shown in FIG. 8, the passivation 130 shall conformably cover all areas on the front surface of the mass flow sensor. The passivation materials are preferably thermally conductive while maintaining mechanical strength. The preferably materials is silicon nitride or silicon carbide deposited using plasma enhanced chemical vapor deposition in a thickness range of 100 nm to 500 nm, but preferably 300 nm for the best surface coverage, mechanical strength and stability.

Making the thermal isolation cavity 150 as shown in FIG. 9 is one of the key steps for manufacture of the mass flow sensor. The cavity right below the sensing elements 311 and 313 and the micro-heater 312 provides the thermal isolation by the now medium (gas or gases) and will ensure the sensitivity as well as the resolution. The cavity is preferably made with deep reactive ion etching of the bulk silicon or the wet chemical etching using such as potassium hydroxide or tetramethyl ammonium hydroxide. This process also requires the membrane of the film stack with the isolation 110, supporting membrane 120, all thermistors (311, 313 and 312), and the passivation layer to be mechanically strong with minimal materials stress build-in. Otherwise the film stack might be collapsed after the making of the cavity. After the cavity is made, the mass flow sensor process is concluded and is ready for the making of the assembly.

The first step to make the said complete MEMS mass flow sensor assembly is to prepare the mass flow sensor carrier after the mass flow sensor is prepared, as shown in FIG. 10. The substrate of the printed circuitry board 400 materials can be ceramics such as silicon nitride or conventional printed circuitry board materials of laminates or Resin impregnated B-stage cloth or other copper based materials. The thickness of the substrate shall be application specific. The printed circuitry 410 is copper-based materials with gold surface plating for best electrical contact. The printed circuitry can be simple connection lines with through substrate connection or with pre-designed control electronic components depending, on the requirements of applications. The surface isolation 420 is preventive for any possible contact shortages and enhancement of reliability. The solder bump 430 is prepared for the connection to the mass flow sensor backside contact that shall be treated or metallization with gold or aluminum but preferably with gold.

The said final sensor assembly is shown in FIG. 11. The mass flow sensor is fixed on the carrier substrate via the direct soldering process. This process can be done automatically by the programmable die-attachment equipment. The complete assembly can be served as an extension of the mass flow sensor for easy installation or even as a standard alone module if the control electronics is included on the carrier printed circuitry board. The said complete mass flow sensor assembly provides enhanced reliability, easy manufacturability and flexibility for additional requirements in package or application specific installations. In order to ensure the said mass flow sensor assembly could also work at different environments such as the presence of water vapors or conductive flow medium, a sealing of the contact between the mass flow sensor chip and the carrier printed circuitry board is also necessary as shown in FIG. 12. The sealing (500) can be done with epoxy or similar materials depending on the applications. This sealing shall be able to prevent failures or damages due to the leakage (for example in the presence of the water vapors) induced contact shortage or breakdown.

The invention claimed is:

1. A MEMS silicon thermal mass flow sensor assembly comprising:

A MEMS silicon thermal mass flow sensor chip having four thermistors as sensing elements which include a micro-heater thermistor, an ambient temperature sensing thermistor, a upstream thermistor and a downstream thermistor; wherein said MEMS silicon mass flow sensor chip having through-holes on silicon substrate that are filled with conductive materials and electrically connected to the thermistors on the front surface; and A MEMS silicon mass flow sensor carrier having the printed circuitry board that provides direct soldering to the said silicon mass flow sensor; and wherein the printed circuitry board can be equipped with or without control electronics;

wherein said MEMS silicon mass flow sensor chip having a thermal isolating cavity beneath the micro-heater thermistor, the upstream thermistor and the downstream thermistor;

wherein said MEMS silicon mass flow sensor chip having surface passivation with the highly thermal conductive materials;

wherein said MEMS silicon mass flow sensor chip having the backside contacts connecting to the conductive through substrate materials and is ready to connect through direct soldering to the sensor carrier; and wherein in a case if the silicon substrate is conductive, the through substrate holes shall be in the form of through substrate rings that are filled with isolation materials.

2. The MEMS silicon mass flow sensor assembly of claim 1 wherein said MEMS silicon mass flow sensors utilizes calorimetric measurement principle having a micro-heater thermistor and two sensing element thermistors placed symmetrical or nonsymmetrical with respect to the micro-heater thermistor; an ambient temperature sensing thermistor for measurement of environmental temperature; wherein the thermistors could be made with noble metals, metal alloys such as platinum or permalloy or doped polysilicon materials with desired conductivity; wherein thicknesses of the thermistors are preferably in the range of 100 nm to 500 nm but most preferably 200 nm for performance and stability.

3. The MEMS silicon mass flow sensor assembly of claim 1 wherein said MEMS silicon mass flow sensors having the backside contacts connected to the front side thermistors to form through substrate conductive pathways; wherein the conductive pathways are formed by a deep reactive ion etching of the substrate forming a through or non-through substrate holes and then filled with conductive materials.

4. The MEMS silicon mass flow sensor assembly of claim 1 wherein said silicon mass flow sensor has through substrate conductive pathways; the conductive pathways on preferred non-conductive silicon substrate contain preferred metals such as plated nickel or heavily doped polysilicon materials or even conductive polymers such as polypyrenes or polycarbazoles; In case that the pathways first formed is non-through holes in the substrate, after the filling and formation of the conductive materials in the etched holes; a chemical-mechanical planarization process will be applied to remove the portion of the silicon substrate corresponding to the non-through holes thickness such that a completed through substrate conductive pathways can be formed.

5. The MEMS silicon mass flow sensor assembly of claim 1 wherein said silicon mass flow sensor has a case that the silicon substrate is conductive, the conductive pathways can utilize the substrate materials; it preferably uses deep reactive ion etching to form through substrate rings around the pre-designed through substrate pathways; wherein the rings are preferably non-through substrate leaving a thickness of preferably 5 micro-meters to 10 Micro-meters and preferably about 7 micro-meters; wherein isolation between conductive pathways and substrate can be formed inside the rings by thermal silicon oxidize via the oxidization process or the rings can be filled with non-conductive polymers such as polyimide; wherein then chemical-mechanical planarization process is applied to remove remaining non-through silicon materials such that complete through substrate conductive pathways can be formed.

6. The MEMS silicon mass flow sensor assembly of claim 1 wherein said silicon mass flow sensor has through substrate conductive pathways on both ends shall be metallized using preferably gold such that good connection to the front thermistors and backside connections to the carriers can be established in the later process steps.

7. The MEMS silicon mass flow sensor assembly of claim 1 wherein said silicon mass flow sensor has a thermal isolated cavity beneath the micro-heater and two sensing elements to provide enhanced sensitivity and resolution; wherein the cavity is formed by removal of all silicon materials underneath the membrane materials but the materials removed may or may not include the first isolation silicon nitride film; wherein the cavity is preferably having a size not larger than 1.5 times of the total sizes of the micro-heater thermistor and the two sensing element thermistors, and it is preferably made with deep reactive ion etching, but alternatively it can also be formed via wet chemical etching using potassium hydroxide or tetramethylammonium hydroxide.

8. The MEMS silicon mass flow sensor assembly of claim 1 wherein said silicon mass flow sensor has its surface passivated with highly thermal conductive materials such as silicon nitride or silicon carbide with a thickness range of 100 nm to 500 nm but preferably a thickness of 300 nm; wherein the passivation is preferably made with plasma enhanced chemical vapor deposition.

9. The MEMS silicon mass flow sensor assembly of claim 1 wherein said silicon mass flow sensor shall have a miniature footprint for mass production deployment in low cost; wherein preferred footprint is 1.5×1.5 mm if only minimal numbers of four thermistors are required on for the measurement; wherein in a case if 7 thermistors are required, the footprint could be extended up to 2×2 mm.

10. The MEMS silicon mass flow sensor assembly of claim 1 wherein said silicon mass flow sensor has its final formality with backside contacts which are ready for direct soldering without additional wires; wherein said silicon mass flow sensor eliminates the wire binding process that is it must for conventional silicon mass flow sensor where the wires could be exposed to flow medium causing the reliability if the mass flow sensor footprint is small or the wires sealed with package materials where the sealing may create flow instability.

11. The MEMS silicon mass flow sensor assembly of claim 1 wherein said mass flow sensor carrier can be preferably made of ceramics with printed circuitry board; wherein the mass flow sensor carrier can also be made of conventional materials for printed circuitry board such as laminates or Resin impregnated B-stage cloth or other copper based materials; wherein surface of the carrier shall be passivated and completely non-conductive except where connection pads are presented; wherein bonding pads are preferably plated with gold with conventional thickness for printed circuitry hoard; wherein solder bumps are ready on the connection pads similar to the conventional formality in the semiconductor flip-chip process.

12. The MEMS silicon mass flow sensor assembly of claim 1 wherein said mass flow sensor carrier can have sole connection lines as prepared for the printed circuitry board, or alternatively the carrier can have pre-designed control electronic components.

13. The MEMS silicon mass flow sensor assembly of claim 1 wherein said mass flow sensor attached to the carrier via the direct soldering process and can be done with a standard die-attachment equipment; wherein for harsh environments such as the presence of water vapors, the sensor assembly shall be sealed with package materials such as epoxy at the edge between the mass flow sensor chip and the sensor carrier surface such that no conductive materials leakage to any possible gaps because of die-attachment process shall result in detrimental damages to the completed sensor assembly.

14. The MEMS silicon mass flow sensor assembly of claim 1 wherein said mass flow sensor attached to the carrier forms the final sensor assembly; wherein the formed final sensor assembly shall serve as the sensor assembly ready for installation in various application specific conditions and connected to the control electronics in case that the carrier does not have the control electronics; wherein the formed final sensor assembly with control electronics can be served as a stand-alone flow sensor module that can be directly used for measurement at application sites.

* * * * *